United States Patent
Bai et al.

(10) Patent No.: US 8,351,618 B2
(45) Date of Patent: Jan. 8, 2013

(54) DEREVERBERATION AND NOISE REDUCTION METHOD FOR MICROPHONE ARRAY AND APPARATUS USING THE SAME

(75) Inventors: Mingsian R. Bai, Hsinchu (TW); Ker-Nan Hur, Taipei County (TW); Ying-Ting Liou, Hsinchu (TW)

(73) Assignee: National Chiao Tung University, Hsinchu (TW)

( * ) Notice: Subject to any disclaimer, the term of this patent is extended or adjusted under 35 U.S.C. 154(b) by 299 days.

(21) Appl. No.: 12/721,566

(22) Filed: Mar. 11, 2010

(65) Prior Publication Data

US 2011/0158418 A1 Jun. 30, 2011

(30) Foreign Application Priority Data

Dec. 25, 2009 (TW) ................................. 98145015 A

(51) Int. Cl.
*H04R 3/00* (2006.01)
*H04B 15/00* (2006.01)
(52) U.S. Cl. ........................................ 381/92; 381/94.7
(58) Field of Classification Search .................... 381/92, 381/94.1–94.3, 94.7
See application file for complete search history.

(56) References Cited

U.S. PATENT DOCUMENTS

2008/0317260 A1* 12/2008 Short .............................. 381/92

OTHER PUBLICATIONS

Hur et al., "Speech Enhancement using Equivalent Source Inverse Filtering-Based Microphone Array," National Chiao Tung University, Master Thesis, Jul. 2009.

* cited by examiner

*Primary Examiner* — Ping Lee
(74) *Attorney, Agent, or Firm* — Jianq Chyun IP Office

(57) ABSTRACT

A dereverberation and noise reduction method adapted for a microphone array and an apparatus using the same are proposed. The microphone array receives a plurality of audio signals from an audio source. The dereverberation and noise reduction method includes the following steps. The received audio signals are processed by a beamforming processing, and a first audio signal is generated. Besides, the received audio signals are processed by a suppression processing, and a suppression audio vector is generated. Further, suppression audio vector is processed by an adaptive filtering processing, and a second audio signal is generated. In addition, the second audio signal is subtracted from the first audio signal to acquire an audio output signal, where parameters of the adaptive filtering processing are adjusted according to a feedback of the audio output signal.

34 Claims, 8 Drawing Sheets

DEREVERBERATION AND NOISE REDUCTION METHOD FOR MICROPHONE ARRAY AND APPARATUS USING THE SAME

CROSS-REFERENCE TO RELATED APPLICATION

This application claims the priority benefit of Taiwan application serial no. 98145015, filed on Dec. 25, 2009. The entirety of the above-mentioned patent application is hereby incorporated by reference herein and made a part of specification.

BACKGROUND

1. Technical Field

The invention generally relates to a microphone array apparatus, and more particularly, to a dereverberation and noise reduction method adapted for a microphone array and an apparatus using the same.

2. Related Art

With the advancement of wireless communication technologies, mobile phones gradually become one of necessary communication tools in people's lives nowadays. However, having a conversation on a mobile phone held in hand while driving easily causes distraction of the driver and may even cause a traffic accident. Therefore, mobile phones with hand free functionality gradually become widely accepted by the drivers.

Although mobile phones with the hand free functionality can decrease conditions where the drivers are distracted when the mobile phones are used inside a vehicle cabin, generally the receiving microphone of the hand free mobile phone is disposed in front of the drivers such as on the driving wheel or around the windscreen. Since the deposition location of the receiving microphones is away from the driver by a certain distance, the receiving microphones normally not only receives audio sounds of the drivers but also other interfering noises such as the noises from the vehicle running engine, the noises from wind shearing through air, the noises of power transmission system and vibration noises between main components and the body of the vehicle, etc. Besides, since the vehicle cabin is a closed space, an echo (or reverberation) is easily generated inside the closed space when the driver is talking. The person at a remote end having a conversation with the driver can simultaneously hear these interfering noises and reverberation, and the overall communication quality is thereby lowered by such a situation. Therefore, how to efficiently receive audio sounds inside the closed space, effectively remove reverberation and decrease noises becomes a major issue.

SUMMARY

According to exemplary embodiments of the invention, the invention provides a dereverberation and noise reduction method adapted for a microphone array and an apparatus using the same. The dereverberation and noise reduction method and apparatus using the same acquires parameters of an inverse filtering processing and a blocking matrix processing according to a system response measured from an audio source to the microphone array. Besides, the parameters of the inverse filtering processing and the blocking matrix processing are utilized in a generalized side-lobe canceller framework to perform the processing of dereverberation and noise reduction on the received audio signals. In addition, the dereverberation and noise reduction method and apparatus using the same also use an adaptive filtering processing to further reduce remaining side-lobe portions of the received audio signals, and effectively reduces overall energy of an output audio signal.

According to an exemplary embodiment of the invention, a dereverberation and noise reduction method adapted for a single input multiple output (SIMO) microphone array is provided. The SIMO microphone array includes a plurality of microphones, and each of the microphones respectively receives one of a plurality of audio signals from an audio source. Besides, each of the audio signals respectively experiences a gain of a system response between the audio source and the SIMO microphone array. The system response is obtained by a measurement in advance and expressed as a system response matrix H. The gain respectively experienced by each of the audio signals is not substantially completely identical. The dereverberation and noise reduction method includes the following steps. A beamforming processing is applied on the audio signals received by the microphone array, and a first audio signal is generated. The beamforming processing allows a main-lobe portion of the audio signals pass through and reduces a plurality of side-lobe portions of the audio signals. The beamforming processing executes a computation of an inverse filter matrix C, and a relationship between the inverse filter matrix C and the system response matrix H is expressed as the following equation (1):

$$C^T = \alpha H^H \qquad \text{equation (1)},$$

where, $\alpha$ is a real number and greater than zero, $C^T$ is a transpose matrix of the inverse filter matrix C, and $H^H$ is a Hermitian matrix of the system response matrix H. Besides, a suppression processing is applied on the audio signals received by the microphone array, and a suppression audio vector is generated. The suppression processing allows the side-lobe portions of the audio signals pass through and reduces the main-lobe portion of the audio signals. The suppression processing executes a computation of a blocking matrix B, and the blocking matrix B is expressed as the following equation (2):

$$h^H B = 0 \qquad \text{equation (2)},$$

where, $h^H$ is a Hermitian matrix of a frequency response matrix h between the audio source and each of the microphones. Further, an adaptive filtering processing is applied on the suppression audio vector, and a second audio signal is generated. Moreover, the second audio signal is subtracted from the first audio signal to acquire an audio output signal, and a plurality of parameters of the adaptive filtering processing are adjusted according to a feedback of the audio output signal.

According to an exemplary embodiment of the invention, a dereverberation and noise reduction method adapted for a single input multiple output (SIMO) microphone array is also provided. The SIMO microphone array includes a plurality of microphones, and each of the microphones respectively receives one of a plurality of audio signals from an audio source. Besides, each of the audio signals respectively experiences a gain of a system response between the audio source and the SIMO microphone array. The system response is obtained by a measurement in advance and expressed as a system response matrix H. The gain respectively experienced by each of the audio signals is not substantially completely identical. The dereverberation and noise reduction method includes the following steps. A first signal processing is applied on the audio signals received by the microphone array, and a first audio signal is generated. The first signal processing allows a main-lobe portion of the audio signals pass through and reduces a plurality of side-lobe portions of the audio signals. The first signal processing executes a computation of an inverse filter matrix C, and a relationship between the inverse filter matrix C and the system response matrix H is expressed as the following equation (3):

$$C^T = \alpha H^H \quad \text{equation (3),}$$

where, $\alpha$ is a real number and greater than zero, $C^T$ is a transpose matrix of the inverse filter matrix C, and $H^H$ is a Hermitian matrix of the system response matrix H. Besides, a second signal processing is applied on the audio signals received by the microphone array, and a suppression audio vector is generated. The second signal processing allows the side-lobe portions of the audio signals pass through and reduces the main-lobe portion of the audio signals. Further, a third signal processing is applied on the suppression audio vector, and a second audio signal is generated. Moreover, the second audio signal is subtracted from the first audio signal to acquire an audio output signal, and a plurality of parameters of the adaptive filtering processing are adjusted according to a feedback of the audio output signal.

According to an exemplary embodiment of the invention, a dereverberation and noise reduction method adapted for a single input multiple output (SIMO) microphone array is provided. The SIMO microphone array includes a plurality of microphones, and each of the microphones respectively receives one of a plurality of audio signals from an audio source. Besides, each of the audio signals respectively experiences a gain of a system response between the audio source and the SIMO microphone array. The system response is obtained by a measurement in advance and expressed as a system response matrix H. The gain respectively experienced by each of the audio signals is not substantially completely identical. The dereverberation and noise reduction method includes the following steps. A first signal processing is applied on the audio signals received by the microphone array to generate a first audio signal. The first signal processing allows a main-lobe portion of the audio signals pass through and reduces a plurality of side-lobe portions of the audio signals. Besides, a second signal processing is applied on the audio signals received by the microphone array, and a suppression audio vector is generated. The second signal processing allows the side-lobe portions of the audio signals pass through and reduces the main-lobe portion of the audio signals. The second signal processing executes a computation of a blocking matrix B, and the blocking matrix B is expressed as the following equation (4):

$$h^H B = 0 \quad \text{equation (4),}$$

where, $h^H$ is a Hermitian matrix of a frequency response matrix h between the audio source and each of the microphones. Further, a third signal processing is applied on the suppression audio vector, and a second audio signal is generated. Moreover, the second audio signal is subtracted from the first audio signal to acquire an audio output signal, and a plurality of parameters of the adaptive filtering processing are adjusted according to a feedback of the audio output signal.

According to an exemplary embodiment of the invention, a dereverberation and noise reduction apparatus adapted for a single input multiple output (SIMO) microphone array is provided. The SIMO microphone array includes a plurality of microphones, and each of the microphones respectively receives one of a plurality of audio signals from an audio source. Besides, each of the audio signals respectively experiences a gain of a system response between the audio source and the SIMO microphone array. The system response is obtained by a measurement in advance and expressed as a system response matrix H. The gain respectively experienced by each of the audio signals is not substantially completely identical. The dereverberation and noise reduction method includes a fixed beamformer processing unit, a block matrix processing unit, a multiple input canceller unit and a computation unit. The fixed beamformier processing unit applies a beamforming processing on the audio signals received by the microphone array, and generates a first audio signal. The beamforming processing allows a main-lobe portion of the audio signals pass through and reduces a plurality of side-lobe portions of the audio signals. The beamforming processing executes a computation of an inverse filter matrix C, and a relationship between the inverse filter matrix C and the system response matrix H is expressed as the following equation (5):

$$C^T = \alpha H^H \quad \text{equation (5),}$$

where, $\alpha$ is a real number and greater than zero, $C^T$ is a transpose matrix of the inverse filter matrix C, and $H^H$ is a Hermitian matrix of the system response matrix H. Besides, the blocking matrix processing unit applies a suppression processing on the audio signals received by the microphone array, and generates a suppression audio vector. The suppression processing allows the side-lobe portions of the audio signals pass through and reduces the main-lobe portion of the audio signals. The suppression processing executes a computation of a blocking matrix B, and the blocking matrix B is expressed as the following equation (6):

$$h^H B = 0 \quad \text{equation (6),}$$

where, $h^H$ is a Hermitian matrix of a frequency response matrix h between the audio source and each of the microphones. Further, the multiple input canceller is coupled to the block matrix processing unit, receives suppression audio vector, applies an adaptive filtering processing on the suppression audio vector, and generates a second audio signal. Moreover, the computation unit is coupled to the fixed beamformer unit and the multiple input canceller unit. The computation unit includes a first computation input terminal, a second computation input terminal and a computation output terminal. The first computation input terminal receives the first audio signal, the second computation input terminal receives the second audio signal and the computation unit subtracts the second audio signal from the first audio signal to acquire an audio output signal. In addition, a plurality of parameters of the adaptive filtering processing are adjusted according to a feedback of the audio output signal.

In view of the above, the exemplary embodiments of the invention provide a dereverberation and noise reduction method adapted for a microphone array and an apparatus using the same. The dereverberation and noise reduction method applies a beamforming processing on the received audio signals, and simultaneously applies a suppression processing and an adaptive filtering processing on the received audio signals. The audio signal processed by the adaptive filtering is subtracted from the audio signal processed by the beamforming processing so as to acquire an audio output signal. Besides, parameters of the adaptive filtering processing are adjusted according to a feedback of the audio output signal. In addition, the dereverberation and noise reduction method and the apparatus using the same can remove side-lobe portions or the received audio signals, and effectively lower overall energy of the output audio signal.

It is to be understood that both the foregoing general description and the following detailed description are exemplary, and are further intended to provide the explanation of the present disclosure as claimed.

BRIEF DESCRIPTION OF THE DRAWINGS

The accompanying drawings are included to provide a further understanding of the invention, and are incorporated in and constitute a part of this specification. The drawings illustrate embodiments of the invention and serve to explain the principles of the invention together with the description.

DESCRIPTION OF THE EXEMPLARY EMBODIMENTS

Figure 1:
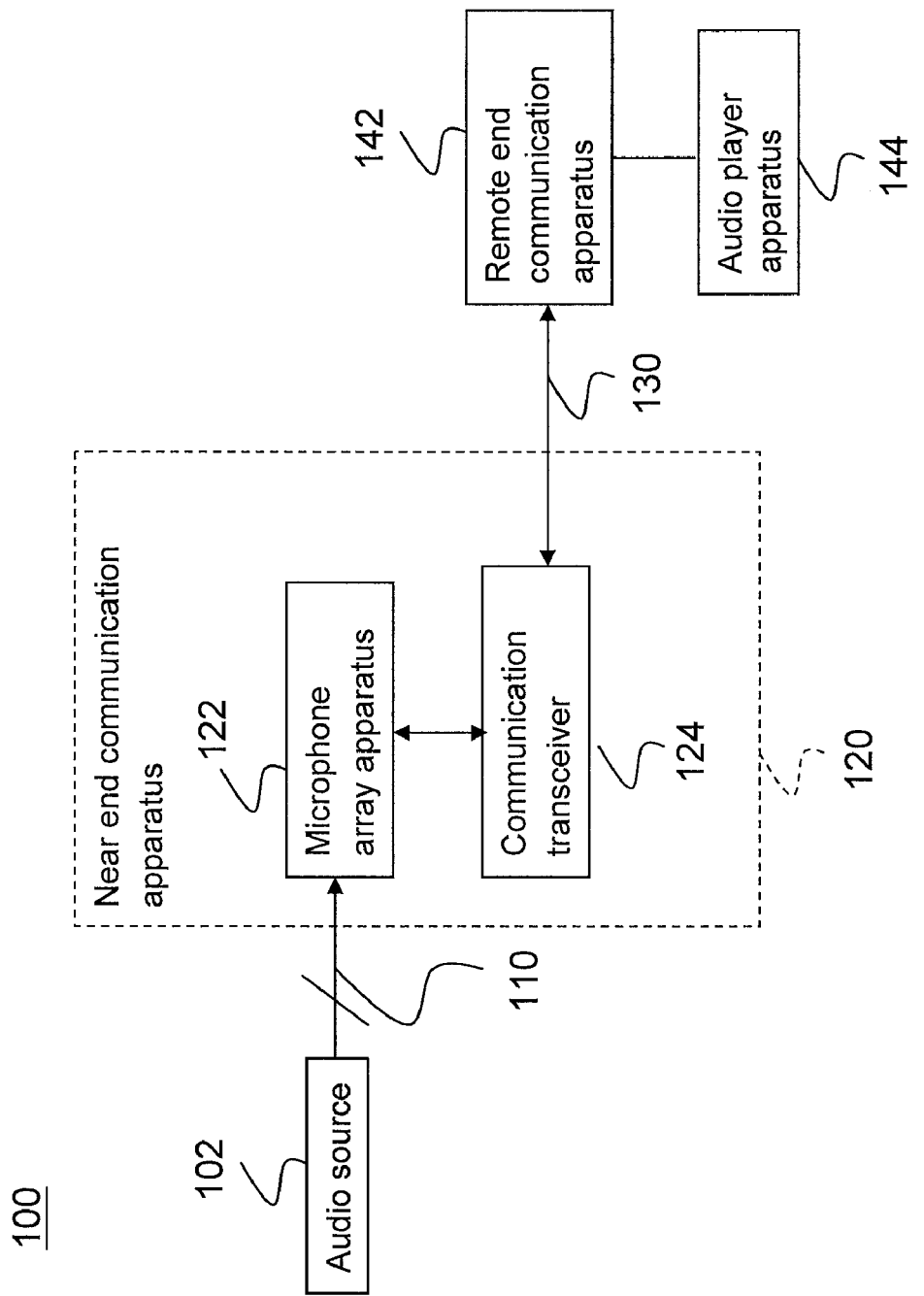
FIG. 1 is a schematic diagram showing an operation environment of a microphone array apparatus adapted for a communication apparatus according to an exemplary embodiment of the invention.

Reference will now be made in detail to the present exemplary embodiments of the invention, examples of which are illustrated in the accompanying drawings. Wherever possible, the same reference numbers are used in the drawings and the description to refer to the same or like parts.

According to exemplary embodiments of the invention, the invention provides a dereverberation and noise reduction method adapted for a microphone array and apparatus using the same. The dereverberation and noise reduction method and apparatus using the same acquires parameters of an inverse filtering processing and a blocking matrix processing according to a system response measured from an audio source to the microphone array. Besides, the parameters of the inverse filtering processing and the blocking matrix processing are utilized in a generalized side-lobe canceller framework to perform the processing of dereverberation and noise reduction on the received audio signals. Moreover, the dereverberation and noise reduction method and apparatus using the same also use an adaptive filtering processing to further reduce remaining side-lobe portions of the received audio signals, and effectively lower overall energy of an output audio signal. In addition, all exemplary embodiments shown below are merely for descriptions but not intended to limit the invention.

Referring to FIG. 1, FIG. 1 is a schematic diagram showing an operation environment of a microphone array apparatus adapted for a communication apparatus according to an exemplary embodiment of the invention. The dereverberation and noise reduction method adapted for a microphone array and apparatus using the same provided by the exemplary embodiments of the invention can be applied in the aforementioned operation environment 100 of a microphone array apparatus. The operation environment 100 includes an audio source 102, a near end communication apparatus 120, a communication link 130, a remote end communication apparatus 142 and an audio player apparatus 144.

Still referring to FIG. 1, the near end communication apparatus 120 also includes a microphone array apparatus 122 and a communication transceiver 124. The microphone array apparatus 122 includes a plurality of microphones, and the microphone array apparatus 122 receives audio signals (e.g., receiving audio signals of a user when the user is talking) via a space channel 110. The space channel 110 is a multi-path space channel. In the present exemplary embodiment, a microphone 1221, a microphone 1222, or a microphone 122m of the microphone array apparatus 122 can be an omni-directional microphone. However, the invention is not limited thereto, and the microphone 1221, the microphone 1222, or the microphones 122m of the microphone array apparatus 122 can be a microphone in other forms. The microphone array apparatus 122 also includes a signal processing unit (not illustrated) and performs a corresponding audio signal processing such as the dereverberation and noise reduction method adapted for a microphone array and apparatus using the same provided by exemplary embodiments of the invention.

Still referring to FIG. 1, the communication transceiver 124 provides a bi-directional communication capability or a single directional communication capability such as transmitting the processed audio signal to the remote end communication apparatus 142 via a communication link 130. The communication link 130 can be a wireless communication link, a cable telephone line link or an optical communication link. After receiving the processed audio signal, the remote end communication apparatus 142 transfers the processed audio signal to the audio player apparatus 144 for performing subsequent audio playing actions. However, the invention is not limited thereto, and the dereverberation and noise reduction method adapted for a microphone array and apparatus using the same provided by the exemplary embodiments of the invention can also be applied in a speech recognition capability. Besides, the dereverberation and noise reduction method adapted for a microphone array and apparatus using the same provided by the exemplary embodiments of the invention can also be applied in an in-car hand free mobile phone, a video conference communication apparatus and an audio conference communication apparatus of a hand free (loudspeaker) type, a voice over Internet Protocol (VoIP) telephone apparatus and so forth. The dereverberation and noise reduction method adapted for a microphone array and apparatus using the same provided by the exemplary embodiments of the invention mainly processes audio signals received by the microphone apparatus 122, reduces reverberation and noises in the audio signals such that audio quality of the sound played by the audio player apparatus 144 can achieve an acceptable level. The operation environment and the operation principle of the related audio filtering apparatus and a microphone array in the microphone array apparatus 122 will be further introduced in accordance with FIG. 2.

Figure 2:
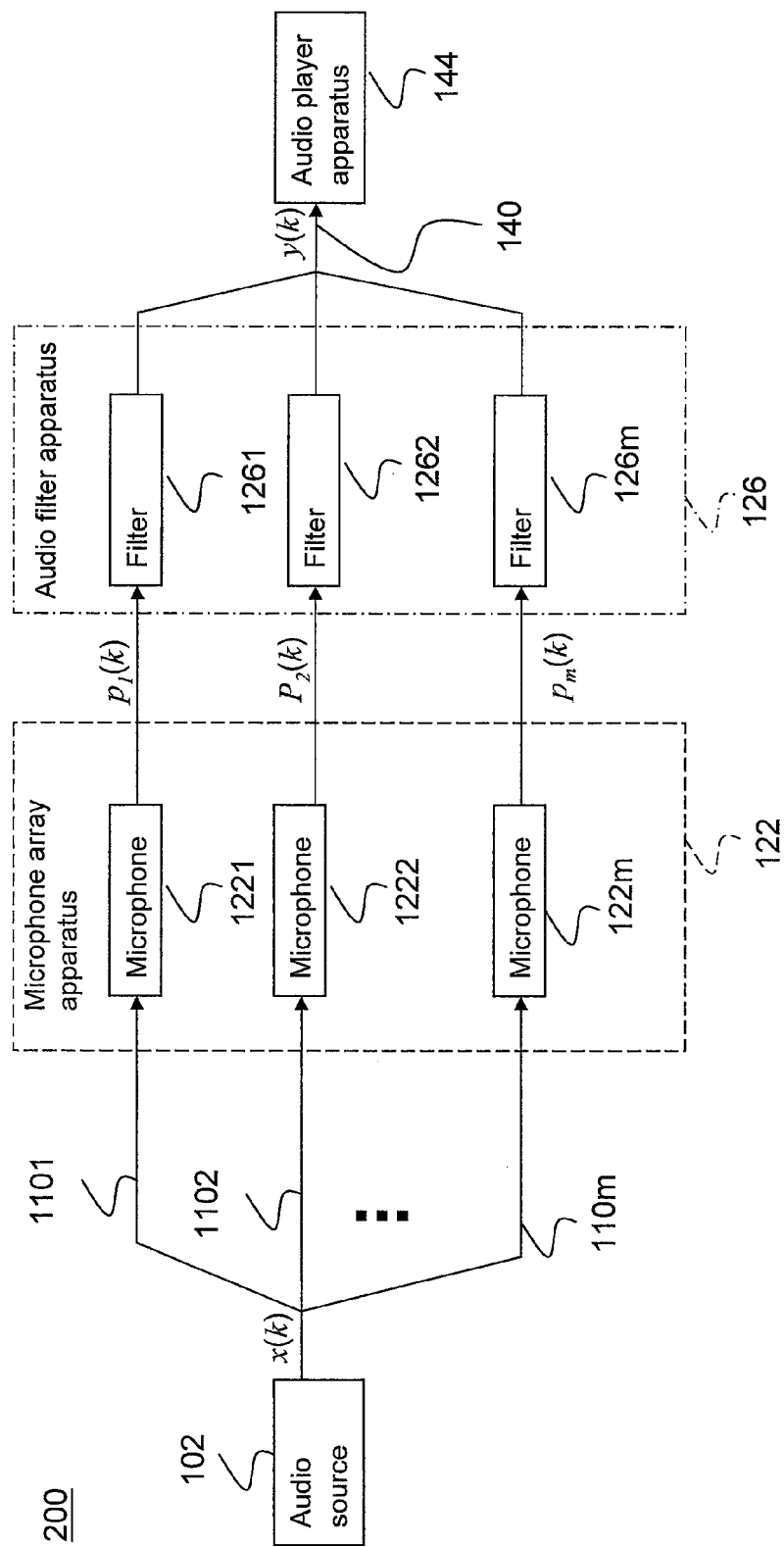
FIG. 2 is a schematic diagram showing an operation environment of a microphone array and an audio filtering apparatus according to a first exemplary embodiment of the invention.

FIG. 2 is a schematic diagram showing an operation environment of a microphone array and an audio filtering apparatus according to a first exemplary embodiment of the invention. In the operation environment 200, the microphone array apparatus 122 is of a single input multiple output (SIMO) microphone array framework and includes m of microphone apparatuses such as the microphone 1221, the microphone 1222 to the microphone 122m, where m is a total number of microphones and m is a positive integer greater than zero. These m microphone apparatuses receives audio input signals x(k) from the audio source 102 but the audio signals of the audio input signals x(k) will be transmitted to each of the m microphone apparatuses via a plurality of space channels. In FIG. 2, a space channel 1101, a space channel 1102 to a space channel 110m respectively represents a space channel from the audio source 102 to the microphone 1221, the microphone 1222 to the microphone 122m, and the gain respectively applied on audio signals by each space channel is not completely identical.

Still referring to FIG. 2, the audio signals received by each microphone of the microphone array apparatus 122 are respectively represented by an audio signal $p_1(k)$, an audio signal $p_2(k)$ to an audio signal $p_m(k)$. The received audio signal $p_1(k)$, an audio signal $p_2(k)$ to an audio signal $p_m(k)$ will be further processed by the audio filtering apparatus 126, and the audio filtering apparatus 126 also includes m of filters to correspondingly process the received audio signals. A filter 1261, a filter 1262 to a filter 126m respectively processes the audio signal $p_1(k)$, an audio signal $p_2(k)$ to an audio signal $p_m(k)$. Finally, the audio filtering apparatus 126 integrates a plurality of the processed audio signals at the communication link 140. The communication link 140 can include the communication link 130 and the remote end communication apparatus 142.

It is to be noted that, the audio input signals x(k), the audio signal $p_1(k)$, the audio signal $p_2(k)$, the audio signal $p_m(k)$ and an audio output signal y(k) are all audio signals representations in time domain. If seen from the perspective of the frequency domain, the audio signals generated by the audio source 102 can be represented by $x(\omega)$ and the audio output signals represented by $y(\omega)$. The system response (or plant) of the space channel between the audio source 102 and the microphone 1221, the microphone 1222 to the microphone 122m can be represented by a system response matrix $H(\omega)$. The system response matrix $H(\omega)$ can be acquired through a spectrum analyzer by using the spectrum analyzer in a designated closed space such as inside the vehicle cabin or in a closed room. Therefore, a relationship between the audio input signals, the system response matrix and each of audio signals ca be represented by the following equation (1) to equation (3):

$$p = Hq \qquad \text{equation (1)},$$

where, $$p = [p_1(\omega) \ldots p_m(\omega)]^T \qquad \text{equation (2)},$$

$$H = [H_1(\omega) \ldots H_m(\omega)]^T \qquad \text{equation (3)},$$

where p is a vector representing the audio signals, H is a transpose matrix of the system response matrix $H(\omega)$ and q is a vector representing the audio input signals $x(\omega)$.

Moreover, from the perspective of the frequency domain, the filter 1261, the filter 1262 to the filter 126m can be represented by the following equation (4):

$$C = [c_1(\omega) \ldots c_m(\omega)]^T \qquad \text{equation (4)},$$

where C is a frequency response matrix representing the frequency response of each filter.

After being processed by a specific matrix computation, the frequency response matrix $C(\omega)$ of the inverse filter (not illustrated) incorporated with the microphone array apparatus 122, where a relationship of the frequency response matrix $C(\omega)$ and the system response matrix $H(\omega)$ can be represented by the following equation (5):

$$C^T = \alpha H^H \qquad \text{equation (5)},$$

where, the function portions of the frequency response matrix $C(\omega)$ and the system response matrix $H(\omega)$ are omitted in the equation (5), $\alpha$ is a real number and $\alpha$ is greater than zero, $C^T$ is a transpose matrix of the frequency response matrix $C(\omega)$, and $H^H$ is the Hermitian matrix of the system response matrix $H(\omega)$.

In the present exemplary embodiment, when the real number value $\alpha$ of the transpose matrix $C^T$ of the inverse filter is represented by the following equation (6), the inverse filter can be called an equivalent source inverse filter:

$$\alpha = (\|H\|_2^2)^{-1} \qquad \text{equation (6)},$$

where, $\|H\|_2^2$ is a squared value of the 2-norm of the system response matrix $H(\omega)$.

In the present exemplary embodiment, when the real number value $\alpha$ of the transpose matrix $C^T$ of the inverse filter is "1", the inverse filter can be called a phase-conjugated filter, and this is defined from the perspective of the frequency domain. However, from the perspective of the time domain, this phase-conjugated filter is also a time-reversed filter since it is obtained by flipping over an impulse response of the system response matrix $H(\omega)$ in the time domain. However, in practical operations, after the audio signals are processed by the time-reversed filter, the audio signals are required to be processed by an Inverse Fast Fourier Transform (IFFT) processing and an adequate time-domain shifting processing so as to achieve a finite impulse response filter. It is to be noted that the time-reverse filter is originally a non-causal system, so it is required to be processed by an adequate time-domain shifting processing to be implemented or realized as a causal system.

The aforementioned inverse filter can also be incorporated with a generalized side-lobe canceller framework for further removing reverberation, reducing noises and effectively lowering the overall energy of the audio output signal. The inverse filter incorporated with the generalized side-lobe canceller framework (or abbreviated as a SIMO-ESIT incorporated with a GSC framework) will be further described in accordance with FIG. 3 to FIG. 6.

Figure 3:
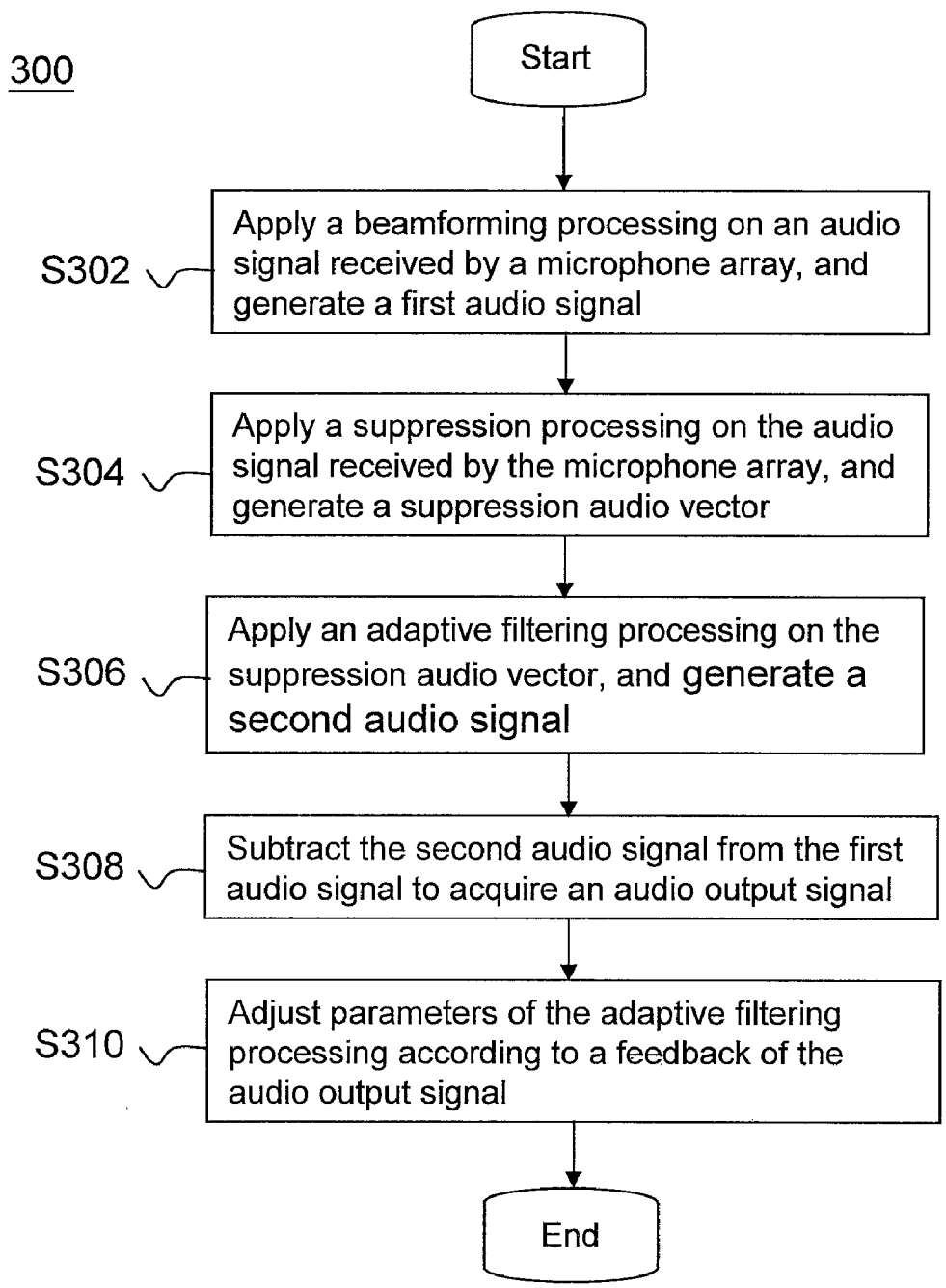
FIG. 3 is a flow chart illustrating a dereverberation and noise reduction method adapted for a microphone array according to a second exemplary embodiment of the invention.

FIG. 3 is a flow chart illustrating a dereverberation and noise reduction method adapted for a microphone array according to a second exemplary embodiment of the invention. Referring to FIG. 3, the dereverberation and noise reduction method 300 starts at step S302. In the step S302, the beamforming processing are applied on the audio signals received by the microphone array, and a first audio signal is generated, where the beamforming processing allows a main-lobe portion of the audio signals pass through and reduces side-lobe portions of the audio signals. Besides, the beamforming processing executes a computation of the inverse filter matrix $C(\omega)$, where the relationship of the inverse filter matrix $C(\omega)$ and the system response matrix $H(\omega)$ is represented as the equation (5) in the first embodiment. After being processed by the beamforming processing, the dereverberation and noise reduction method 300 also can apply the IFFT processing on the audio signals processed by the beamforming processing, and apply an adequate time-domain shifting processing on the audio signals after being processed by the beamforming processing and the IFFT processing so as to generate the first audio signal. After the step S302 is executed, step S304 is executed.

In the step S304, an suppression processing is applied on the audio signals received by the microphone array, and a suppression audio vector is generated. After the step S304, step S306 is executed. The suppression processing allows the side-lobe portions of each of the audio signals pass through and reduces the main-lobe portion of each of the audio signals, and the suppression processing is to execute a computation of the blocking matrix B, where the blocking matrix B is represented by the following equation (7):

$$h^H B = 0 \quad \text{equation (7)},$$

where, $h^H$ is a Hermitian matrix of the frequency response matrix h between the audio source 102 and each microphone. Moreover, when the Hermitian matrix $h^H$ of the frequency response matrix h between the audio source 102 and each microphone is represented by the following equation (8), the blocking matrix B is represented by the following equation (9):

$$h^H = [a_1, a_2, \ldots, a_n], \quad \text{equation (8)}$$

$$B = \begin{bmatrix} \frac{-a_2}{a_1} & \frac{-a_3}{a_1} & \cdots & \frac{-a_n}{a_1} \\ 1 & 0 & \cdots & 0 \\ 0 & 1 & \cdots & \vdots \\ \vdots & \vdots & \cdots & 0 \\ 0 & 0 & \cdots & 1 \end{bmatrix}, \quad \text{equation (9)}$$

where $a_1, a_2, \ldots, a_n$ are respectively the frequency response between the audio source 102 and each microphone, $a_1, a_2, \ldots, a_n$ are real numbers, and n is the total number of these microphones. After the step S304, step S306 is executed.

In the step S306, an adaptive filtering processing is applied on the suppression audio vector, and a second audio signal is generated. In the present exemplary embodiment, the adaptive filtering processing uses a least mean squared method to process the aforementioned suppression audio vector. In addition, the least mean squared method can be expressed as the following equation (10) to equation (13):

$$y(k) = b(k - L_1) - \sum_{n=0}^{N-1} W_n^T(k) Z_n(k), \quad \text{equation (10)}$$

$$W_n(k+1) = W_n(k) + \mu \times y(k) Z_n(k), \quad \text{equation (11)}$$

where, $$W_n(k) = [w_{n,0}(k), w_{n,1}(k), \ldots, w_{n,M_2-1}(k)]^T, \quad \text{equation (12)}$$

$$Z_n(k) = [z_n(k), z_n(k-1), \ldots, z_n(k-M_2+1)]^T, \quad \text{equation (13)}$$

where y(k) is the audio output signal when time is k, b(k) is the first audio signal when the time is k, $L_1$ is a time delay between the audio output signal and the first audio signal, W(k) is an adaptive filter matrix used by the adaptive filtering processing when the time is k, Z(k) is the suppression audio vector when the time is k, $M_2$ is a duration of the adaptive filtering processing and $M_2$ influences an overall operation efficiency of the dereverberation and noise reduction method, and μ is a step size. The time delay $L_1$ between the audio output signal and the first audio signal will be further described in the other exemplary embodiments shown below. After the step S306 is executed, step S308 is executed. In the step S308, the second audio signal is subtracted from the first audio signal so as to acquire the audio output signal.

After the step S308 is executed, step S310 is then executed. In the step S310, a plurality of parameters processed by the adaptive filtering processing are adjusted according to a feedback of the audio output signal. After the step S310, the dereverberation and noise reduction method 300 is ended.

It is to be noted that, the invention is not limited thereto. The step S302 to the step S310 can be operated cyclically, and any step in the step S302 to the step S310 can be operated simultaneously with another step in the step S302 to the step S310. For example, when the step S302 is executed, other steps such as the step S306 and the step S308 can be executed simultaneously. After the dereverberation and noise reduction method 300 adapted for the microphone array provided by the second exemplary embodiment, other possible system structures of the dereverberation and noise reduction apparatuses adapted for the microphone array will be introduced in accordance with FIG. 4 to FIG. 6.

Figure 4:
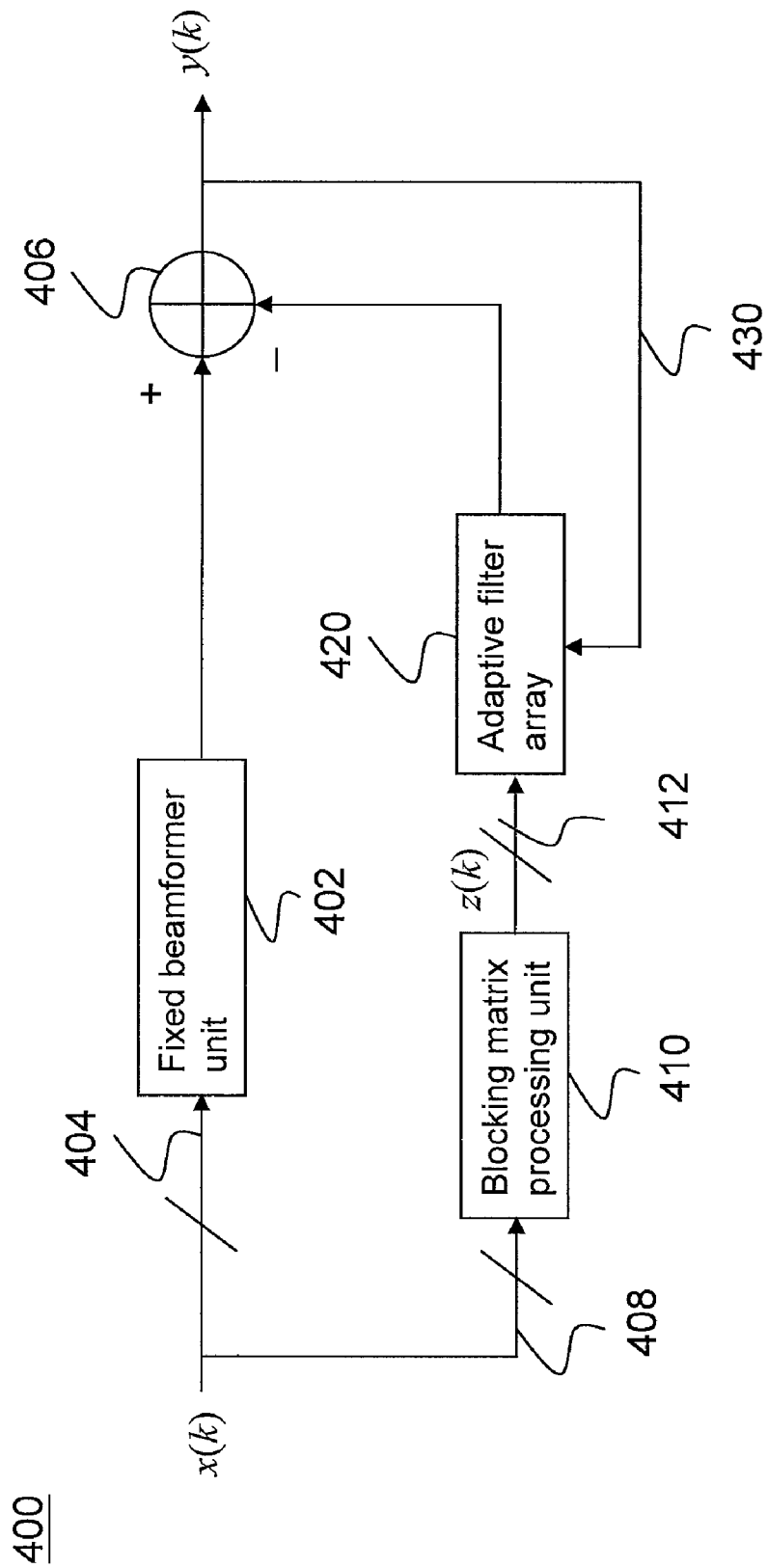
FIG. 4 is a system block diagram illustrating a dereverberation and noise reduction apparatus adapted for a microphone array according to a second exemplary embodiment of the invention.

FIG. 4 is a system block diagram illustrating a dereverberation and noise reduction apparatus adapted for a microphone array according to a second exemplary embodiment of the invention. Referring to FIG. 4, the dereverberation and noise reduction apparatus 400 includes a fixed beamformer unit 402, a blocking matrix processing unit 410, a multiple-input canceller unit 420 (or an adaptive filter array 420) and a computation unit 406. Besides, the dereverberation and noise reduction apparatus 400 also includes a signal transferring link 404, a signal transferring link 408, a signal transferring link 412 and an audio output feedback link 430. It is to be noted that the signal transferring link 404, the signal transferring link 408, and the signal transferring link 412 are parallel buses so they can transfer a plurality of audio signals or signal vector values.

Referring to FIG. 4, in the present exemplary embodiment, the fixed beamformer unit 402 receives a plurality of audio signals x(k) from the signal transferring link 404, and the audio signals received by the microphone array are processed by the beamforming processing, and the first audio signal is generated. The beamforming processing allows the main-lobe portion of the audio signals pass through and reduces the side-lobe portions of the audio signals, and the beamforming processing executes the computation of the inverse filtering matrix C. Moreover, the relationship of the inverse filtering matrix C and the system response matrix H can be expressed as the equation (5) in the first exemplary embodiment. The blocking matrix processing unit 410 receives the audio signal x(k) from the signal transferring link 408 and performs the suppression processing on the audio signals received by the microphone array to generate the suppression audio vector Z(k). The suppression processing allows the side-lobe portions of the audio signals pass through and reduces the main-lobe portion of the audio signals. Moreover, the suppression processing is to perform a computation of the blocking matrix B, and the blocking matrix B can be expressed as the aforementioned equation (7).

The multiple-input canceller unit 420 is coupled to the blocking matrix processing unit 410, receives the suppression audio vector Z(k), and applies an adaptive filtering processing on the suppression audio vector Z(k), and the second audio signal is generated. In the present exemplary embodiment, the multiple-input canceller unit 420 can use an adaptive filter array to achieve the effects of the multi-input canceling but the invention is not limited thereto. Moreover, the computation unit 406 is coupled to the fixed beamformer 404 and the multiple-input canceller unit 420 (or the adaptive filter array). The computation unit 406 includes a first computation input terminal, a second computation input terminal and a computation output terminal. The first computation input terminal receives the first audio signal, the second computation input terminal receives the second audio signal and the computation unit 406 subtracts the second audio signal from the first audio signal to acquire the audio output signal y(k) and outputs the audio output signal y(k) to the computation output terminal. Further, the multiple-input canceller unit 420 adjusts a plurality of parameters of the adaptive filter array by receiving a feedback of the audio output signal. Besides, since the dereverberation and noise reduction apparatus 400 has two signal processing paths such as an upper path and a reduce path, the time delay $L_1$ between the audio output signal and the first audio signal hereby causes the first audio signal and the second audio signal arrive at the computation unit 406 at the same time. For example, when the sampling rate is 8 kHz, the time delay $L_1$ can be configured to as 250 sampling points, or that is 31.25 micro-seconds after being converted into time.

Moreover, it is to be noted that, in other exemplary embodiments of the invention, the aforementioned fixed beamformer unit 402 can be a phase-conjugated filter or an inverse filter with the inverse filtering processing effectiveness. These two different system structures will be respectively introduced in accordance to FIG. 5 and FIG. 6.

Figure 5:
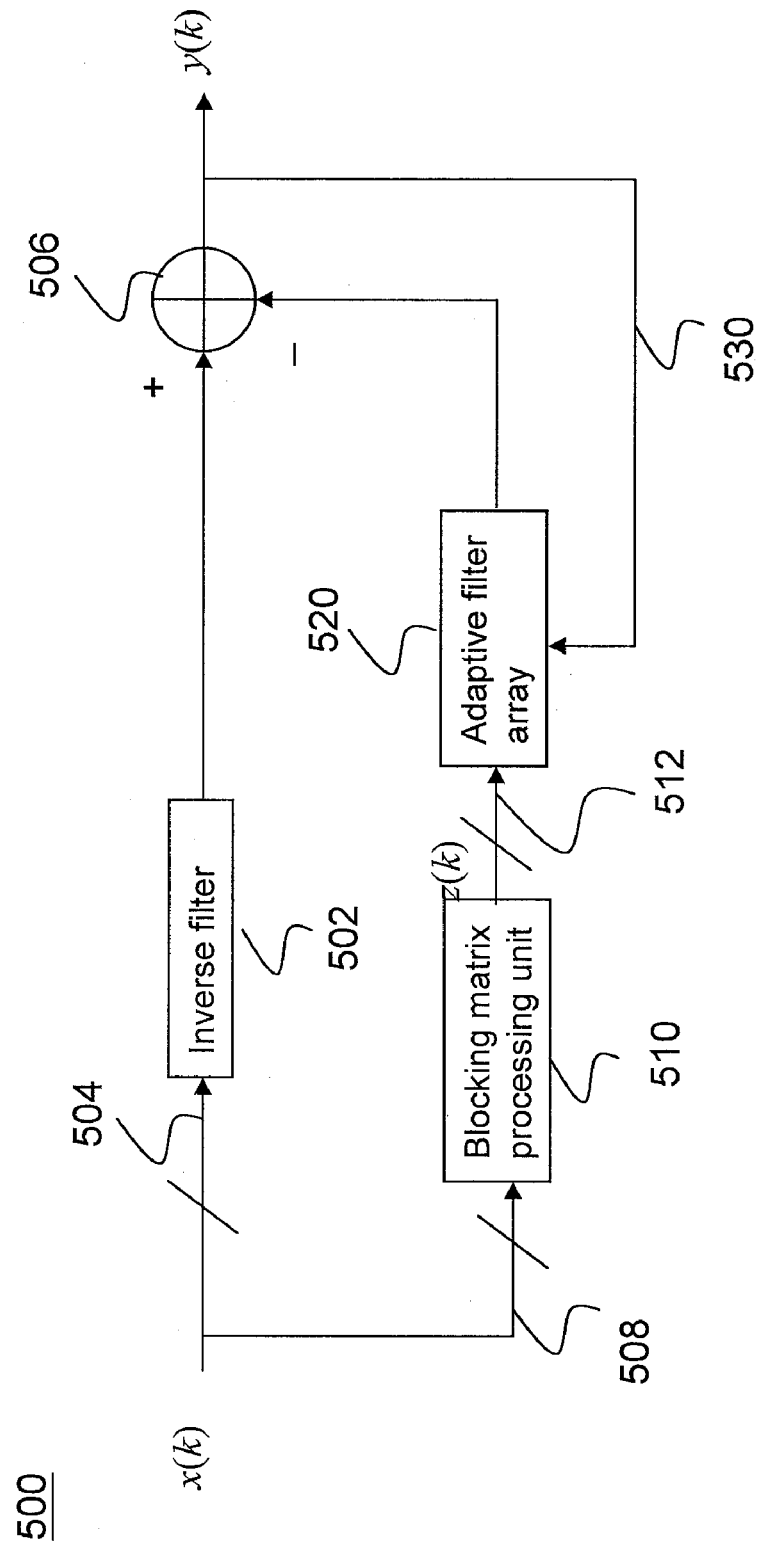
FIG. 5 is a system block diagram illustrating a dereverberation and noise reduction apparatus adapted for a microphone array according to a third exemplary embodiment of the invention.

FIG. 5 is a system block diagram illustrating a dereverberation and noise reduction apparatus adapted for a microphone array according to a third exemplary embodiment of the invention. Referring to FIG. 5, in the present exemplary embodiment, the dereverberation and noise reduction apparatus 500 and the dereverberation and noise reduction apparatus 400 are similar but a difference between them is just that the fixed beamformer unit 402 is realized by an inverse filter 502, and the inverse filter 502 has the characteristics of the aforementioned equation (5) and equation (6), especially the value of the real number α in the equation (5) of the inverse filter 502 is less than 1. Other parts such as a blocking matrix processing unit 510, a adaptive filter array 520, a computation unit 506, a signal transferring link 504, a signal transferring link 508, a signal transferring link 512 and the audio output signal feedback link 530 are respectively identical to the blocking matrix processing unit 410, the adaptive filter array 420, the computation unit 406, the signal transferring link 404, the signal transferring link 408, the signal transferring link 412 and the audio output signal feedback link 430.

Figure 6:
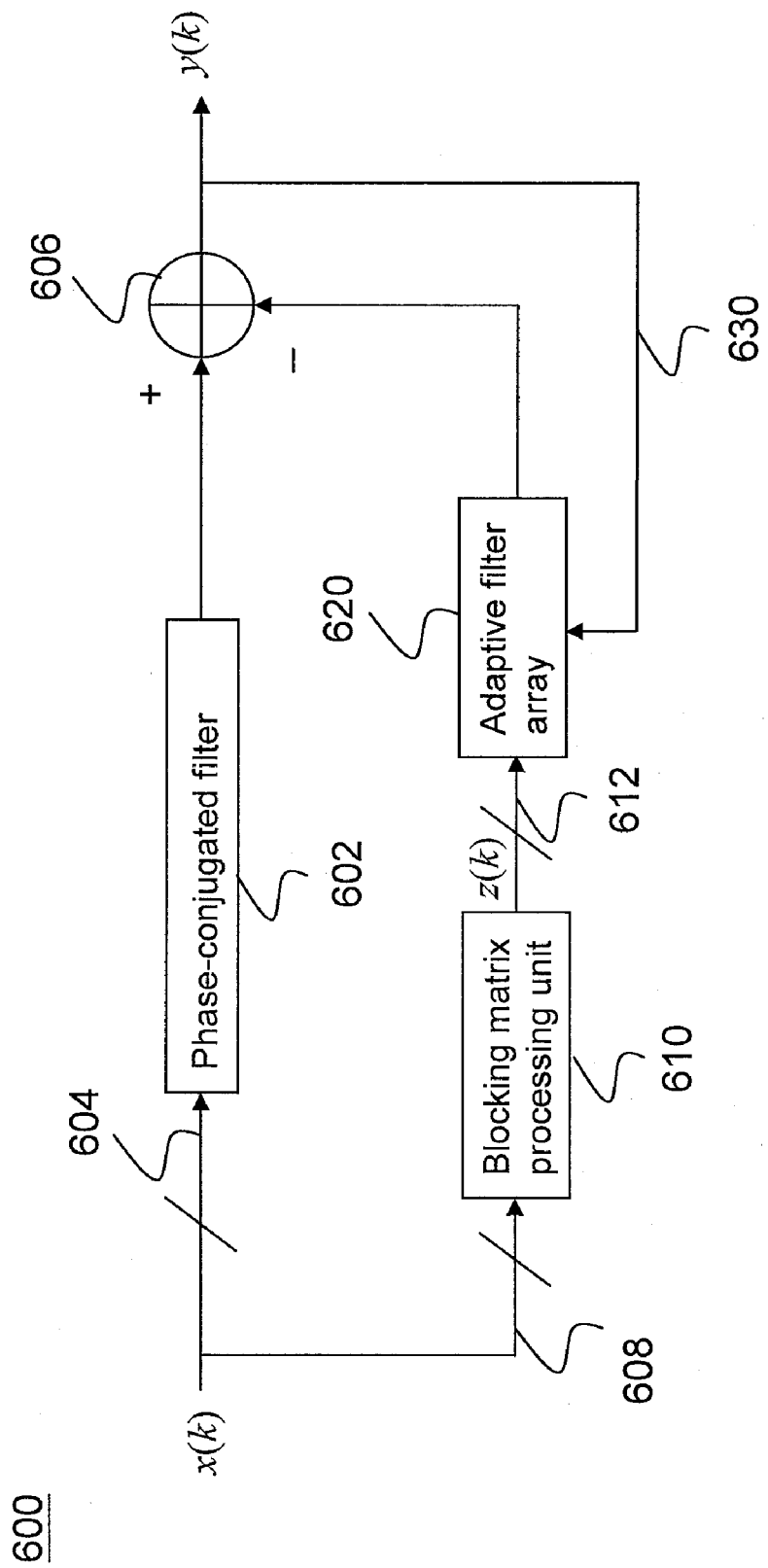
FIG. 6 is a system block diagram illustrating a dereverberation and noise reduction apparatus adapted for a microphone array according to a fourth exemplary embodiment of the invention.

FIG. 6 is a system block diagram illustrating a dereverberation and noise reduction apparatus adapted for a microphone array according to a fourth exemplary embodiment of the invention. Referring to FIG. 6, in the present exemplary embodiment, the dereverberation and noise reduction apparatus 600 and the dereverberation and noise reduction apparatus 400 are similar but difference between them is just that the fixed beamformer unit 402 is realized by an phase-conjugated filter 602, and the phase-conjugated filter 602 has the characteristics of the aforementioned equation (5) and equation (6), especially the value of the real number a in the equation (5) of the inverse filter 502 is less than 1. Other parts such as a blocking matrix processing unit 610, a adaptive filter array 620, a computation unit 606, a signal transferring link 604, a signal transferring link 608, a signal transferring link 612 and the audio output signal feedback link 630 are respectively identical to the blocking matrix processing unit 410, the adaptive filter array 420, the computation unit 406, the signal transferring link 404, the signal transferring link 408, the signal transferring link 412 and the audio output signal feedback link 430.

Figure 7:
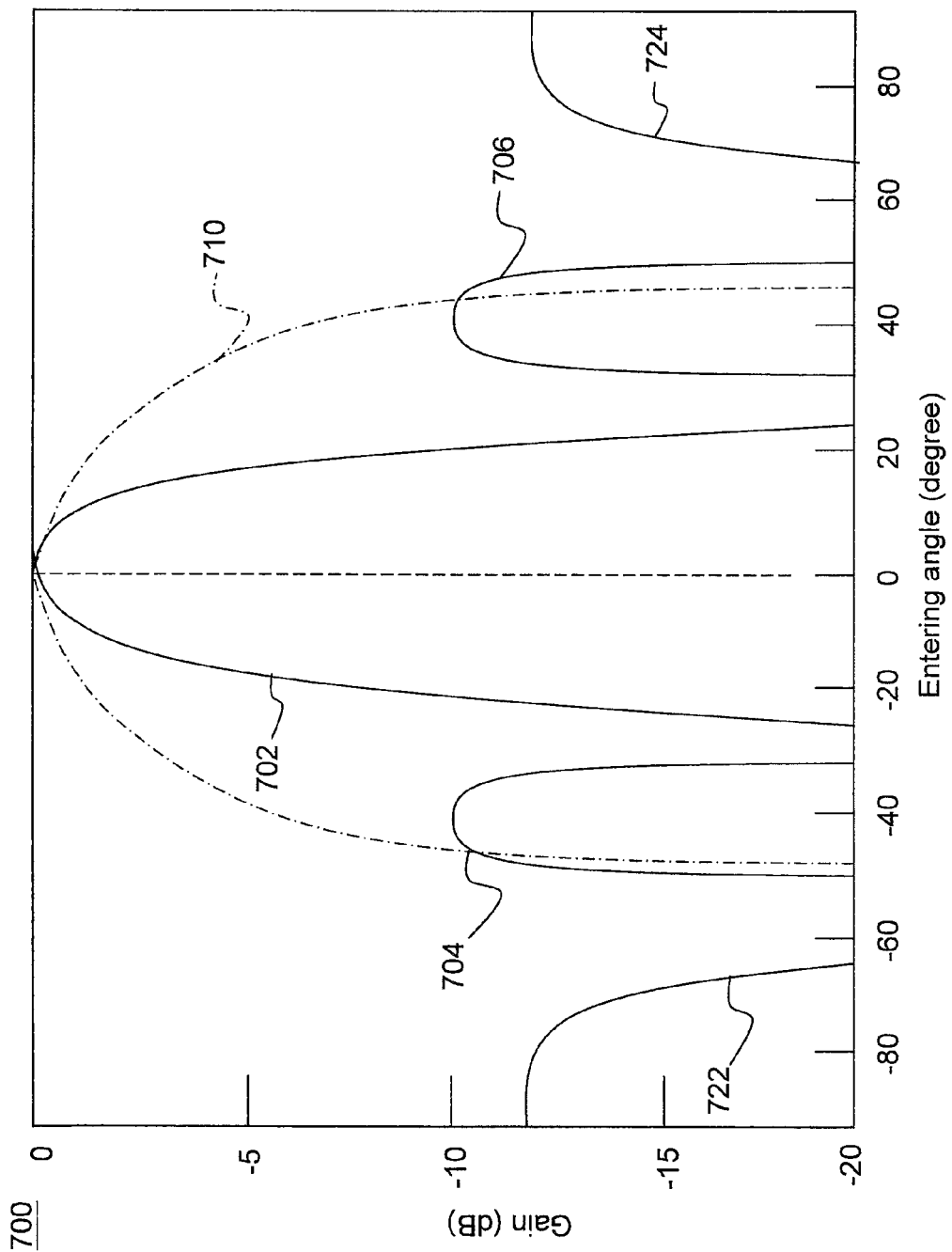
FIG. 7 is a schematic diagram illustrating directive gains of audio signals received by a microphone array according to an exemplary embodiment of the invention.
Figure 8:
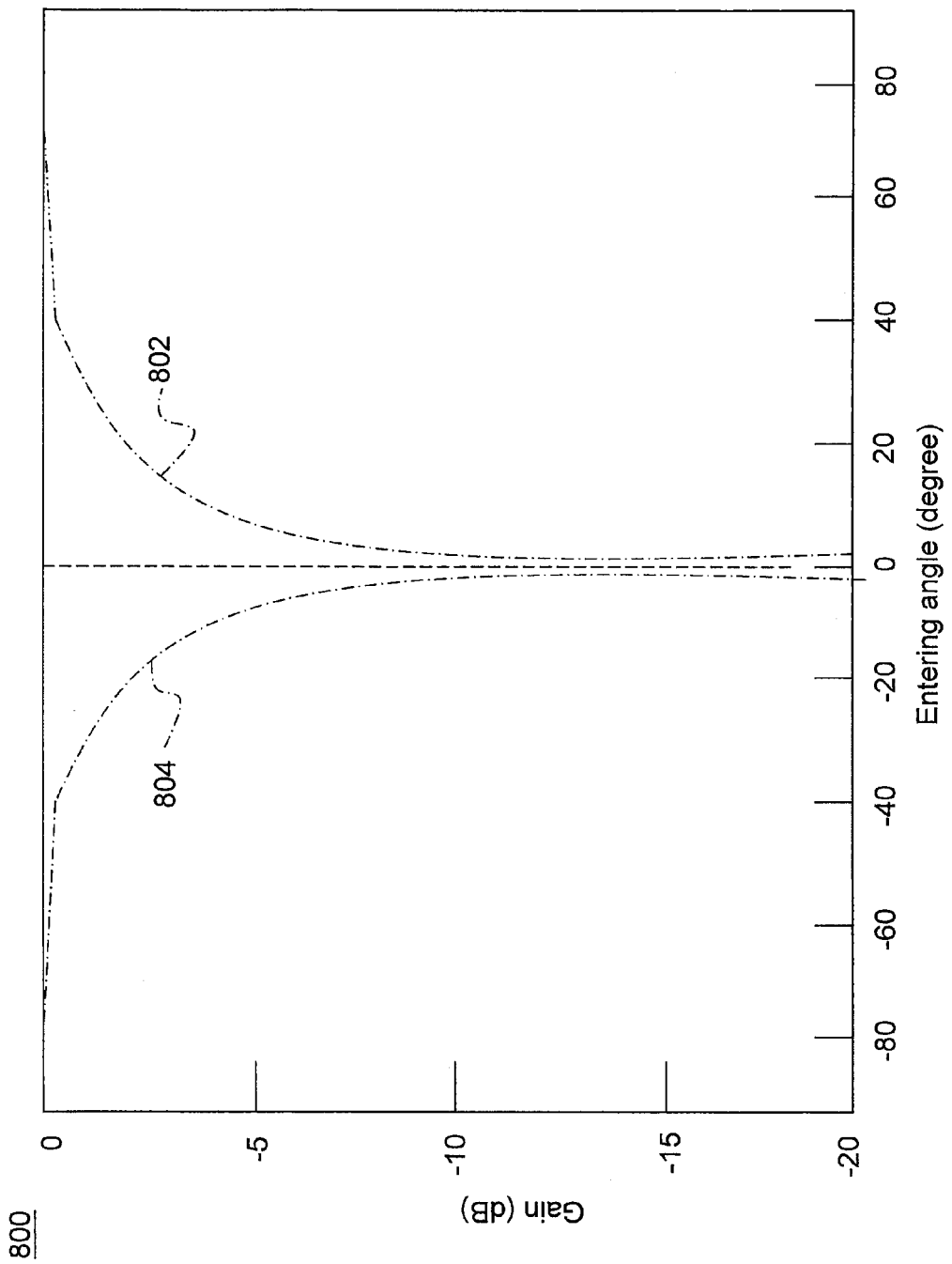
FIG. 8 is a schematic diagram illustrating directive gains of a blocking matrix processing unit according to an exemplary embodiment of the invention.

After the dereverberation and noise reduction apparatus used in a microphone array provided by each exemplary embodiment are introduced, the directive gains of audio signals received by a microphone array and the system response of the fixed beamforming apparatus will be introduced in accordance with FIG. 7 to FIG. 8.

FIG. 7 is a schematic diagram illustrating directive gains of audio signals received by a microphone array according to an exemplary embodiment of the invention. Referring to FIG. 7, in the directive gains schematic diagram, the horizontal axis is an entering direction (or an entering angle) where a portion of the audio signals enters the microphone array apparatus 122, and the vertical axis is the gain values with which each audio signal will be experienced. As illustrated in FIG. 7, the audio signals received by the microphone array apparatus 122 includes a main-lobe portion 710, a side-lobe portion 704, a side-lobe portion 706, a side-lobe portion 722, a side-lobe portion 724 and so forth. Other audio signal portions are omitted herein since their entering angles into the microphone array apparatus 122 are greater than 90 degrees. The dereverberation and noise reduction method 300 used in a microphone array and the dereverberation and noise reduction apparatus 400 to the dereverberation and noise reduction apparatus 600 used in a microphone array provided by each exemplary embodiment are just designed to filter the audio signals entering the microphone array apparatus 122 such that the side-lobe portion 704, the side-lobe portion 706, the side-lobe portion 722 and the side-lobe portion 724 are filtered out and just the main-lobe portion 702 is remained. The dash line 710 refers to the audio signal portions remained after being filtered at lower sampling rate (e.g., 2 kHz).

FIG. 8 is a schematic diagram illustrating directive gains of a blocking matrix processing unit according to an exemplary embodiment of the invention. Referring to FIG. 8, a curve 802 and a curve 804 are combined to represent the gain curve of the blocking matrix processing unit 410 with respect to the audio signals which enter the microphone array apparatus 122. As illustrated in FIG. 8, the blocking matrix processing unit 410 has a gain of −20 decibel (dB) with respect to the audio signal with an entering angle of 0 degree. As the entering angle gradually increases, the gains of the blocking matrix processing unit 410 with respect to the audio signals gradually increases as well. Accordingly, the blocking matrix processing unit 410 allows the side-lobe portion of the audio signals pass through and reduces the main portion of the audio signals.

The processing effects of the dereverberation and noise reduction apparatus 500 and the dereverberation and noise reduction apparatus 600 respectively provided by the third exemplary embodiment and the fourth exemplary embodiment will be introduced by the following table I.

TABLE I

| | Inverse filter | | Time-reversed filter (phase-conjugated filter) | |
|---|---|---|---|---|
| | SIMO | GSC | SIMO | GSC |
| $SNR_1$ (dB) | 7.51 | 7.51 | 7.51 | 7.51 |
| $SNR_1$ (dB) | 16.43 | 16.76 | 16.06 | 16.74 |
| SNRG (dB) | 8.92 | 9.25 | 8.56 | 9.23 |
| SDI (dB) | 3.56 | 3.56 | 1.47 | 3.56 |

Referring to FIG. 1, it is to be noted that, the Table I compares an input audio signal signal-to-noise ratio (SNR), an output audio signal SNR, a SNR Gain (SNRG) and a speech-distortion index (SDI) of the inverse filter and the phase-conjugated filter respectively in two different frameworks (a SIMO microphone array framework and the SIMO-ESIT incorporated with the GSC framework).

The way of calculating the input audio signal SNR is expressed as the following equation (14):

$$SNR_1(\text{dB}) = 10\log\frac{E\{x_1^2\}}{E\{v_1^2\}}, \quad \text{equation (14)}$$

where E(x) is an expectation function, $x_1$ represents the audio signals received by the first microphone, and $v_1$ represents the noises received by the first microphone.

The way of calculating the output audio signal SNR is expressed as the following equation (15):

$$SNR_A(\text{dB}) = 10\log\frac{E\{|c^T * x|^2\}}{E\{|c^T * v|^2\}}, \quad \text{equation (15)}$$

where x represents an input audio signal vector, v represents a noise signal vector, and $C^T$ is a transpose matrix of the system response of the inverse filter or a transpose matrix of the system response of the phase-conjugated filter.

The way of calculating the SNRG is expressed as the following equation (16):

$$SNRG(\text{dB}) = SNR_A - SNR_1 \quad \text{equation (16)},$$

where the SNRG is a difference between the input audio signal SNR and the output audio signal SNR.

The way of calculating the SDI is expressed as the following equation (17):

$$SDI(\text{dB}) = 10\log\frac{E\{x_1^2\}}{E\{|x_1 - c^T * v|^2\}}. \quad \text{equation (17)}$$

As illustrated in the Table I, the output audio signal SNRs of the inverse filter and the phase-conjugated filter are more enhanced in the SIMO-ESIT incorporated with the GSC framework than those in the SIMO microphone array framework. SNRGs of the inverse filter and the phase-conjugated filter in the SIMO-ESIT incorporated with the GSC framework are also more enhanced in a similar fashion. Moreover, the SDI of the phase-conjugated filter is better in the SIMO microphone array framework than that in the SIMO-ESIT incorporated with the GSC framework. There are more speech distortions for the inverse filter in both two different frameworks but the speech distortions are still within acceptable ranges.

To sum up, according to the exemplary embodiments of the invention, the invention provides the dereverberation and noise reduction methods adapted for a microphone array and an apparatuses using the same. The dereverberation and noise reduction methods apply the beamforming processing on the received audio signals, and apply the suppression processing and the adaptive filtering processing on the received audio signals simultaneously. The audio signal processed by the adaptive filtering processing is subtracted from the audio signal processed by the beamforming processing to acquire the audio output signal. Besides, the parameters of the adaptive filtering processing are adjusted according to a feedback of the audio output signals. Further, the dereverberation and noise reduction method and the apparatus using the same can reduce the side-lobe portions of the received audio signals, suppress the reverberation and remove the noises, and thereby effectively lower the overall energy of the audio output signal. In addition, when the dereverberation and noise reduction method and the apparatus using the same are incorporated with the generalized side-lobe canceller framework, the directive gains and the SNR parameters of the microphone array can be enhanced.

It will be apparent to those skilled in the art that various modifications and variations of the exemplary embodiments can be made to the structure of the invention without departing from the scope or spirit of the invention. In view of the foregoing descriptions, it is intended that the present disclosure covers modifications and variations of the exemplary embodiments if they fall within the scope of the following claims and their equivalents.

What is claimed is:

1. A dereverberation and noise reduction method, adapted for a single input multiple output (SIMO) microphone array, wherein the SIMO microphone array comprises a plurality of microphones, and each of the microphones respectively receives one of a plurality of audio signals from an audio source, wherein each of the audio signals respectively experiences a gain of a system response between the audio source and the SIMO microphone array, the system response is obtained by a measurement in advance and expressed as a system response matrix H, and the gain respectively experienced by each of the audio signals is not substantially completely identical, the dereverberation and noise reduction method comprising:

applying a beamforming processing on the audio signals received by the microphone array, and generating a first audio signal, wherein the beamforming processing allows a main-lobe portion of the audio signals pass through and reduces a plurality of side-lobe portions of the audio signals, and the beamforming processing executes a computation of an inverse filter matrix C, wherein a relationship between the inverse filter matrix C and the system response matrix H is expressed as the following equation (1):

$$C^T = \alpha H^H \quad \text{equation (1)},$$

wherein, $\alpha$ is a real number and greater than zero, $C^T$ is a transpose matrix of the inverse filter matrix C, and $H^H$ is a Hermitian matrix of the system response matrix H;

applying a suppression processing on the audio signals received by the microphone array, and generating a suppression audio vector, wherein the suppression processing allows the side-lobe portions of the audio signals pass through and reduces the main-lobe portion of the audio signals, and the suppression processing executes a computation of a blocking matrix B, wherein the blocking matrix B is expressed as the following equation (2):

$$h^H B = 0 \quad \text{equation (2)},$$

wherein, $h^H$ is a Hermitian matrix of a frequency response matrix h between the audio source and each of the microphones;

applying an adaptive filtering processing on the suppression audio vector, and generating a second audio signal and subtracting the second audio signal from the first audio signal to acquire an audio output signal, wherein a plurality of parameters of the adaptive filtering processing are adjusted according to a feedback of the audio output signal.

2. The dereverberation and noise reduction method according to claim 1, wherein after the beamforming processing, the dereverberation and noise reduction method further comprises:
   applying an inverse Fast Fourier Transform (IFFT) processing on the audio signals processed by the beamforming processing; and
   applying an adequate time-domain shifting processing on the audio signals processed by the beamforming processing and the IFFT processing so as to generate the first audio signal.

3. The dereverberation and noise reduction method according to claim 1, wherein the real number $\alpha$ is 1.

4. The dereverberation and noise reduction method according to claim 1, wherein the real number $\alpha$ is expressed as the following equation (3):

$$\alpha = (\|H\|_2^2)^{-1} \qquad \text{equation (3)},$$

wherein, $\|H\|_2^2$ is a squared value of a 2-norm value of the system response matrix H.

5. The dereverberation and noise reduction method according to claim 1, wherein when the Hermitian matrix $h^H$ of the system frequency response matrix h between the audio source and each of the microphones is expressed as the following equation (4), the blocking matrix B is expressed as the following equation (5):

$$h^H = [a_1, a_2, \ldots, a_n], \qquad \text{equation (4)}$$

$$B = \begin{bmatrix} \frac{-a_2}{a_1} & \frac{-a_3}{a_1} & \cdots & \frac{-a_n}{a_1} \\ 1 & 0 & \cdots & 0 \\ 0 & 1 & \cdots & \vdots \\ \vdots & \vdots & \cdots & 0 \\ 0 & 0 & \cdots & 1 \end{bmatrix}, \qquad \text{equation (5)}$$

wherein, $a_1, a_2, \ldots, a_n$ respectively is a frequency response value between the audio source and each of the microphones and $a_1, a_2, \ldots, a_n$ are real numbers, and a is a total number of the microphones.

6. The dereverberation and noise reduction method according to claim 1, wherein the adaptive filtering processing uses a least mean square method to process the suppression audio vector.

7. The dereverberation and noise reduction method according to claim 6, wherein the least mean square method is expressed as the following equation (6) to equation (9):

$$y(k) = b(k - L_1) - \sum_{n=0}^{N-1} W_n^T(k) Z_n(k), \qquad \text{equation (6)}$$

$$W_n(k+1) = W_n(k) + \mu \times y(k) Z_n(k), \qquad \text{equation (7)}$$

where, $$W_n(k) = [w_{n,0}(k), w_{n,1}(k), \ldots, w_{n,M_2-1}(k)]^T, \qquad \text{equation (8)}$$

$$Z_n(k) = [z_n(k), z_n(k-1), \ldots, z_n(k-M_2+1)]^T, \qquad \text{equation (9)}$$

wherein y(k) is the audio output signal when time is k, b(k) is the first audio signal when the time is k, $L_1$ is a time delay between the audio output signal and the first audio signal, W(k) is an adaptive filtering matrix used by the adaptive filtering processing when the time is k, Z(k) is the suppression audio vector when the time is k, $M_2$ is a duration of the adaptive filtering processing and influences an overall operation efficiency of the dereverberation and noise reduction method, and $\mu$ is a step size.

8. The dereverberation and noise reduction method according to claim 1, wherein each of the microphones comprises an omni-directional microphone.

9. A dereverberation and noise reduction method, adapted for a single input multiple output (SIMO) microphone array, wherein the SIMO microphone array comprises a plurality of microphones, and each of the microphones respectively receives one of a plurality of audio signals from an audio source, wherein each of the audio signals respectively experiences a gain of a system response between the audio source and the SIMO microphone array, the system response is obtained by a measurement in advance and expressed as a system response matrix H, and the gain respectively experienced by each of the audio signals is not substantially completely identical, the dereverberation and noise reduction method comprising:
   applying a first signal processing on the audio signals received by the microphone array, and generating a first audio signal, wherein the first signal processing allows a main-lobe portion of the audio signals pass through and reduces a plurality of side-lobe portions of the audio signals, and the first signal processing executes a computation of an inverse filter matrix C, wherein a relationship between the inverse filter matrix C and the system response matrix H is expressed as the following equation (1):

$$C^T = \alpha H^H \qquad \text{equation (1)},$$

wherein, $\alpha$ is a real number and greater than zero, $C^T$ is a transpose matrix of the inverse filter matrix C, and $H^H$ is a Hermitian matrix of the system response matrix H;
   applying a second signal processing on the audio signals received by the microphone array, and generating a suppression audio vector, wherein the second signal processing allows the side-lobe portions of the audio signals pass through and reduces the main-lobe portion of the audio signals;
   applying a third signal processing on the suppression audio vector, and generating a second audio signal; and
   subtracting the second audio signal from the first audio signal to acquire an audio output signal, wherein a plurality of parameters of the third signal processing are adjusted according to a feedback of the audio output signal.

10. The dereverberation and noise reduction method according to claim 9, the second signal processing executes a computation of a blocking matrix B, wherein the blocking matrix B is expressed as the following equation (2):

$$h^H B = 0 \qquad \text{equation (2)},$$

wherein, $h^H$ is a Hermitian matrix of a frequency response matrix h between the audio source and each of the microphones.

11. The dereverberation and noise reduction method according to claim 10, wherein after the first signal processing, the dereverberation and noise reduction method further comprises:
   applying an inverse Fast Fourier Transform (IFFT) processing on the audio signals processed by the first signal processing; and
   applying an adequate time-domain shifting processing on the audio signals processed by the first signal processing and the IFFT processing so as to generate the first audio signal.

12. The dereverberation and noise reduction method according to claim 10, wherein when the Hermitian matrix $h^H$ of the system frequency response matrix h between the audio source and each of the microphones is expressed as the following equation (4), the blocking matrix B is expressed as the following equation (5):

$$h^H = [a_1, a_2, \ldots, a_n], \quad \text{equation (4)}$$

$$B = \begin{bmatrix} \frac{-a_2}{a_1} & \frac{-a_3}{a_1} & \cdots & \frac{-a_n}{a_1} \\ 1 & 0 & \cdots & 0 \\ 0 & 1 & \cdots & \vdots \\ \vdots & \vdots & \cdots & 0 \\ 0 & 0 & \cdots & 1 \end{bmatrix}, \quad \text{equation (5)}$$

wherein, $a_1, a_2, \ldots, a_n$ respectively is a frequency response value between the audio source and each of the microphones and $a_1, a_2, \ldots a_n$ are real numbers, and n is a total number of the microphones.

13. The dereverberation and noise reduction method according to claim 9, wherein the real number α is 1.

14. The dereverberation and noise reduction method according to claim 9, wherein the real number α is expressed as the following equation (3):

$$\alpha = (\|H\|_2^2)^{-1} \quad \text{equation (3),}$$

wherein, $\|H\|_2^2$ is a squared value of a 2-norm value of the system response matrix H.

15. The dereverberation and noise reduction method according to claim 9, wherein the third signal processing uses a least mean square method to process the suppression audio vector.

16. The dereverberation and noise reduction method according to claim 15, wherein the least mean square method is expressed as the following equation (6) to equation (9):

$$y(k) = b(k - L_1) - \sum_{n=0}^{N-1} W_n^T(k) Z_n(k), \quad \text{equation (6)}$$

$$W_n(k+1) = W_n(k) + \mu \times y(k) Z_n(k), \quad \text{equation (7)}$$

where, $$W_n(k) = [w_{n,0}(k), w_{n,1}(k), \ldots, w_{n,M_2-1}(k)]^T, \quad \text{equation (8)}$$

$$Z_n(k) = [z_n(k), z_n(k-1), \ldots, z_n(k-M_2+1)]^T, \quad \text{equation (9)}$$

y(k) is the audio output signal when time is k, b(k) is the first audio signal when the time is k, $L_1$ is a time delay between the audio output signal and the first audio signal, W(k) is an adaptive filtering matrix used by the third signal processing when the time is k, Z(k) is the suppression audio vector when the time is k, $M_2$ is a duration of the third signal processing and influences an overall operation efficiency of the dereverberation and noise reduction method, and μ is a step size.

17. The dereverberation and noise reduction method according to claim 9, wherein each of the microphones comprises an omni-directional microphone.

18. A dereverberation and noise reduction method, adapted for a single input multiple output (SIMO) microphone array, wherein the SIMO microphone array comprises a plurality of microphones, and each of the microphones respectively receives one of a plurality of audio signals from an audio source, wherein each of the audio signals respectively experiences a gain of a system response between the audio source and the SIMO microphone array, the system response is obtained by a measurement in advance and expressed as a system response matrix H, and the gain respectively experienced by each of the audio signals is not substantially completely identical, the dereverberation and noise reduction method comprising:

applying a first signal processing on the audio signals received by the microphone array, and generating a first audio signal, wherein the first signal processing allows a main-lobe portion of the audio signals pass through and reduces a plurality of side-lobe portions of the audio signals;

applying a second signal processing on the audio signals received by the microphone array, and generating a suppression audio vector, wherein the second signal processing allows the side-lobe portions of the audio signals pass through and reduces the main-lobe portion of the audio signals, and the second signal processing executes a computation of a blocking matrix B, wherein the blocking matrix B is expressed as the following equation (1):

$$h^H B = 0 \quad \text{equation (1),}$$

wherein, $h^H$ is a Hermitian matrix of a frequency response matrix h between the audio source and each of the microphones;

applying a third signal processing on the suppression audio vector, and generating a second audio signal; and subtracting the second audio signal from the first audio signal to acquire an audio output signal, wherein a plurality of parameters of the third signal processing are adjusted according to a feedback of the audio output signal.

19. The dereverberation and noise reduction method according to claim 18, wherein the first signal processing executes a computation of an inverse filter matrix C, and a relationship between the inverse filter matrix C and the system response matrix H is expressed as the following equation (2):

$$C^T = \alpha H^H \quad \text{equation (2),}$$

wherein, α is a real number and greater than zero, $C^T$ is a transpose matrix of the inverse filter matrix C, and $H^H$ is a Hermitian matrix of the system response matrix H.

20. The dereverberation and noise reduction method according to claim 19, wherein the real number α is 1.

21. The dereverberation and noise reduction method according to claim 19, wherein the real number α is expressed as the following equation (3):

$$\alpha = (\|H\|_2^2)^{-1} \quad \text{equation (3),}$$

wherein, $\|H\|_2^2$ is a squared value of a 2-norm value of the system response matrix H.

22. The dereverberation and noise reduction method according to claim 18, wherein after the first signal processing, the dereverberation and noise reduction method further comprises:

applying an inverse Fast Fourier Transform (IFFT) processing on the audio signals processed by the first signal processing; and applying an adequate time-domain shifting processing on the audio signals processed by the first signal processing and the IFFT processing so as to generate the first audio signal.

23. The dereverberation and noise reduction method according to claim 18, wherein when the Hermitian matrix $h^H$ of the system frequency response matrix h between the audio source and each of the microphones is expressed as the following equation (4), the blocking matrix B is expressed as the following equation (5):

$$h^H = [a_1, a_2, \ldots, a_n] \qquad \text{equation (4)},$$

wherein, $a_1, a_2, \ldots, a_n$ respectively is a frequency response value between the audio source and each of the microphones, and $a_1, a_2, \ldots a_n$ are real numbers, and n is a total number of the microphones.

24. The dereverberation and noise reduction method according to claim 18, wherein the third signal processing uses a least mean square method to process the suppression audio vector.

25. The dereverberation and noise reduction method according to claim 24, wherein the least mean square method is expressed as the following equations (6) to equation (9):

$$W_n(k+1) = W_n(k) + \mu \times y(k) Z_n(k) \qquad \text{equation (7)},$$

wherein, $$W_n(k) = [w_{n,0}(k), w_{n,1}(k), \ldots, w_{n,M_2-1}(k)]^T \qquad \text{equation (8)},$$

$$Z_n(k) = [z_n(k), z_n(k-1), \ldots, z_n(k-M_2+1)]^T \qquad \text{equation (9)},$$

wherein y(k) is the audio output signal when time is k, b(k) is the first audio signal when the time is k, $L_1$ is a time delay between the audio output signal and the first audio signal, W(k) is an adaptive filter matrix used by the third signal processing when the time is k, Z(k) is the suppression audio vector when the time is k, $M_2$ is a duration of the third signal processing and influences an overall operation efficiency of the dereverberation and noise reduction method, and μ is a step size.

26. The dereverberation and noise reduction method according to claim 18, wherein each of the microphones comprises an omni-directional microphone.

27. A dereverberation and noise reduction apparatus, adapted for a single input multiple output (SIMO) microphone array, wherein the SIMO microphone array comprises a plurality of microphones, and each of the microphones respectively receives one of a plurality of audio signals from an audio source, wherein each of the audio signals respectively experiences a gain of a system response between the audio source and the SIMO microphone array, the system response is obtained by a measurement in advance and expressed as a system response matrix H, and the gain respectively experienced by each of the audio signals is not substantially completely identical, the dereverberation and noise reduction method comprising:

a fixed beamformer unit, configured for applying a beamforming processing on the audio signals received by the microphone array, and generating a first audio signal, wherein the beamforming processing allows a main-lobe portion of the audio signals pass through and reduces a plurality of side-lobe portions of the audio signals, and the beamforming processing executes a computation of an inverse filter matrix C, wherein a relationship between the inverse filter matrix C and the system response matrix H is expressed as the following equation (1):

$$C^T = \alpha H^H \qquad \text{equation (1)},$$

wherein, α is a real number and greater than zero, $C^T$ is a transpose matrix of the inverse filter matrix C, and $H^H$ is a Hermitian matrix of the system response matrix H;

a blocking matrix processing unit, configured for applying a suppression processing on the audio signals received by the microphone array, and generating a suppression audio vector, wherein the suppression processing allows the side-lobe portions of the audio signals pass through and reduces the main-lobe portion of the audio signals, and the suppression processing executes a computation of a blocking matrix B, wherein the blocking matrix B is expressed as the following equation (2):

$$h^H B = 0 \qquad \text{equation (2)},$$

wherein, $h^H$ is a Hermitian matrix of a frequency response matrix h between the audio source and each of the microphones;

a multiple input canceller unit, coupled to the blocking matrix processing unit and configured for applying an adaptive filtering processing to the suppression audio vector, and generating a second audio signal; and a computation unit, coupled to the fixed beamformer unit and the multiple input canceller unit, wherein the computation unit comprises a first computation input terminal, a second computation input terminal and a computation output terminal, wherein the first computation input terminal receives the first audio signal, the second computation input terminal receives the second audio signal, and the computation unit is configured for subtracting the second audio signal from the first audio signal to acquire an audio output signal, wherein a plurality of parameters of the multiple input canceller unit is adjusted according to a feedback of the audio output signal.

28. The dereverberation and noise reduction apparatus according to claim 27, wherein after the beamforming processing, the dereverberation and noise reduction apparatus further comprises:

an Inverse Fast Fourier Transform (IFFT) processing unit, configured for applying an IFFT processing on the audio signals processed by the beamforming processing; and the fixed beamforming unit, configured for applying an adequate time-domain shifting processing on the audio signals processed by the beamforming processing and the IFFT processing so as to generate the first audio signal.

29. The dereverberation and noise reduction apparatus according to claim 27, wherein the real number α is 1.

30. The dereverberation and noise reduction apparatus according to claim 27, wherein the real number α is expressed as the following equation (3):

$$\alpha = (\|H\|_2^2)^{-1} \qquad \text{equation (3)},$$

wherein, $\|H\|_2^2$ is a squared value of a 2-norm value of the system response matrix H.

31. The dereverberation and noise reduction apparatus according to claim 27, wherein when the Hermitian matrix $h^H$ of the system frequency response matrix h between the audio source and each of the microphones is expressed as the following equation (4), the blocking matrix B is expressed as the following equation (5):

$$h^H = [a_1, a_2, \ldots, a_n], \qquad \text{equation (4)}$$

$$B = \begin{bmatrix} \frac{-a_2}{a_1} & \frac{-a_3}{a_1} & \cdots & \frac{-a_n}{a_1} \\ 1 & 0 & \cdots & 0 \\ 0 & 1 & \cdots & \vdots \\ \vdots & \vdots & \cdots & 0 \\ 0 & 0 & \cdots & 1 \end{bmatrix}, \quad \text{equation (5)}$$

wherein, $a_1, a_2, \ldots, a_n$ respectively is a frequency response value between the audio source and each of the microphones, and $a_1, a_2, \ldots, a_n$ are real numbers, and n is a total number of the microphones.

32. The dereverberation and noise reduction apparatus according to claim 27, wherein the adaptive filtering processing uses a least mean square method to process the suppression audio vector.

33. The dereverberation and noise reduction apparatus according to claim 32, wherein the least mean square method is expressed as the following equations (6) to equation (9):

$$y(k) = b(k - L_1) - \sum_{n=0}^{N-1} W_n^T(k) Z_n(k), \quad \text{equation (6)}$$

$$W_n(k+1) = W_n(k) + \mu \times y(k) Z_n(k), \quad \text{equation (7)}$$

where, $$W_n(k) = [w_{n,0}(k), w_{n,1}(k), \ldots, w_{n,M_2-1}(k)]^T, \quad \text{equation (8)}$$

$$Z_n(k) = [z_n(k), z_n(k-1), \ldots, z_n(k-M_2+1)]^T, \quad \text{equation (9)}$$

wherein y(k) is the audio output signal when time is k, b(k) is the first audio signal when the time is k, $L_1$ is a time delay between the audio output signal and the first audio signal, W(k) is an adaptive filter matrix used by the adaptive filtering processing when the time is k, Z(k) is the suppression audio vector when the time is k, $M_2$ is a duration of the adaptive filtering processing and influences an overall operation efficiency of the dereverberation and noise reduction apparatus, and μ is a step size.

34. The dereverberation and noise reduction apparatus according to claim 27, wherein each of the microphones comprises an omni-directional microphone.

* * * * *